United States Patent [19]

Patel

[11] Patent Number: 4,542,450
[45] Date of Patent: Sep. 17, 1985

[54] ELECTRICAL CONVERTER INCLUDING GAIN ENHANCING MEANS FOR LOW GAIN TRANSISTORS

[75] Inventor: Dahyabhai C. Patel, Reading, United Kingdom

[73] Assignee: Astec Europe Limited, Reading, United Kingdom

[21] Appl. No.: 511,458

[22] Filed: Jul. 7, 1983

[30] Foreign Application Priority Data

Jul. 24, 1982 [GB] United Kingdom ............... 8221480

[51] Int. Cl.[4] .......................................... H02M 3/335
[52] U.S. Cl. ................... 363/23; 331/113 A; 363/56; 363/133
[58] Field of Search ............. 331/113 A, 114; 363/22, 363/23, 24, 25, 55, 56, 131, 133, 134

[56] References Cited

U.S. PATENT DOCUMENTS

| | | | |
|---|---|---|---|
| 2,905,906 | 9/1959 | Kittl | 331/113 A |
| 3,010,074 | 11/1961 | Kiesling | 331/113 A |
| 3,015,772 | 1/1962 | Rochelle | 331/113 A |
| 3,029,398 | 4/1962 | McComb | 331/113 A |
| 3,089,077 | 5/1963 | Lee | 363/133 |
| 3,161,837 | 12/1964 | Lloyd | 363/133 |
| 3,289,067 | 11/1966 | Pinckaers | 363/22 |
| 3,323,075 | 5/1967 | Lingle | 331/113 A |
| 3,437,903 | 4/1969 | Webb | 363/56 |
| 3,466,570 | 9/1969 | Webb | 363/133 |
| 3,470,496 | 9/1969 | Dembling | 363/133 |
| 3,493,895 | 2/1970 | Lingle | 363/22 |
| 3,663,944 | 5/1972 | Low et al. | 363/133 |
| 3,723,848 | 4/1972 | Miller | 363/133 |
| 4,004,251 | 1/1977 | Hesler et al. | 331/113 A |
| 4,149,234 | 4/1979 | Smith | 363/133 |
| 4,279,011 | 7/1981 | Nilssen | 363/133 |
| 4,307,353 | 12/1981 | Nilssen | 363/133 |
| 4,334,267 | 6/1982 | Miko | 363/22 |
| 4,414,491 | 11/1983 | Elliott | 331/113 A |

FOREIGN PATENT DOCUMENTS

| | | | |
|---|---|---|---|
| 940739 | 10/1963 | United Kingdom . | |
| 1212627 | 11/1970 | United Kingdom . | |
| 1532472 | 11/1978 | United Kingdom . | |
| 2051432 | 5/1979 | United Kingdom | 363/133 |
| 2039186A | 7/1980 | United Kingdom | 363/133 |
| 1578134 | 11/1980 | United Kingdom . | |
| 2086164A | 5/1982 | United Kingdom | 331/113 A |

Primary Examiner—Peter S. Wong
Assistant Examiner—Jeffrey Sterrett
Attorney, Agent, or Firm—Stevens, Davis, Miller & Mosher

[57] ABSTRACT

An electrical converter for supplying electrical power to a load from a d.c. source and which includes semiconductor switching means for converting a direct input current to an alternating current and output transformer means fed with the alternating current for changing the magnitude of the output voltage with respect to the input voltage, wherein the semiconductor means includes transistor means connected with a drive transformer means in a configuration which provides for switching in response to saturation of at least a part of the drive transformer means, and the drive transformer means includes a winding connected in the main current circuit of the transistor means in a configuration providing current feed-back to a drive branch of the circuit connected to a control electrode of the transistor means to increase the response of the transistor means to drive signals derived from the input current and effectively provide a forced D.C. gain, thereby enabling a lower gain transistor means to be employed for a given minimum input voltage from the source.

4 Claims, 4 Drawing Figures

ELECTRICAL CONVERTER INCLUDING GAIN ENHANCING MEANS FOR LOW GAIN TRANSISTORS

BACKGROUND OF THE INVENTION

Field of the Invention

This invention relates to an electrical converter of the type, (hereinafter referred to as being the kind specified), for supplying electrical power to a load from a d.c. source and which includes semi-conductor switching means for converting a direct input current to an alternating current, and output transformer means fed with the alternating current for changing the magnitude of the output voltage with respect to the input voltage.

Such semi-conductor switching means in conventional circuits of the kind specified typically comprises transistors which have higher gains than are strictly necessary, in order to ensure that each such transistor can switch fully on (i.e. saturate) when required to do so even when provided with weak input voltages. Compared with lower gain transistors, such high gain transistors are relatively expensive, have relatively long storage times which both limit the frequency of said alternating current and introduce phase lags which cause switching losses to occur, and carry on undesirably high main current when supplied with a higher than average input signal, thus giving rise to unwanted heating effects.

SUMMARY OF THE INVENTION

According to the present invention, we provide an electrical converter of the kind specified wherein the semi-conductor means includes transistor means connected with a drive transformer means in a configuration which provides for switching in response to saturation of at least a part of the drive transformer means, and the drive transformer means includes a winding connected in the main current circuit of the transistor means in a configuration providing current feed-back to a drive branch of the circuit connected to a control electrode of the transistor means in a sense to increase the response of the transistor means to drive signal derived from the input current and effectively provide a forced D.C. gain, thereby enabling a lower gain transistor means to be employed for a given minimum input voltage from the source.

The term transistor means is used herein to denote semi-conductor means having main electrodes between which the main current passes unidirectionally when said electrodes are appropriately polarised and the initiation and cessation of current flow is determined by the electrical bias applied to a control electrode.

Preferably, a feed back winding of the output transformer means is also connected in the main current circuit of the transistor means in a configuration to provide voltage feed-back in the drive branch of the circuit in a sense to initiate drive. The voltage feed-back may also reduce the risk of excessive current flow in the main current circuit under conditions of heavy loading.

Thus in an electrical converter in accordance with the invention one can avoid the use of high gain transistors with their inherent disadvantages such as those hereinbefore described.

An electrical converter in accordance with the invention and which incorporates such a feed-back winding in the output transformer means is relatively robust compared with conventional circuits, being less prone to damage through connecting it to an inappropriately higher output loading such as inadvertently short-circuiting its output terminals.

In a preferred arrangement in accordance with the invention, the transistor means comprises a pair of transistors connected for mutually exclusive on and off conditions of conduction, each transistor of the pair being connected to a saturable drive transformer forming at least part of the drive transformer means, said saturable drive transformer having primary windings (or sections of a primary winding) connected respectively in series with the main current circuits of the transistors of that pair, and having secondary windings (or sections of a secondary winding) connected to respective control electrodes of the transistors of that pair to provide said current feed-back.

The main current circuits may be connected in series with the primary windings (or sections of a primary winding) of an output transformer the secondary winding of which provides the output of the converter.

Two such pairs of transistors may be used in a bridge configuration.

The converter may provide an a.c. output from a d.c. input.

Alternatively or in addition the converter may provide a d.c. output from a d.c. input by provision in association with the output transformer means of a rectifier means.

A biasing means may be provided for the drive circuit for biasing said control electrode with respect to one of the main electrodes of the transistor means, and including a diode means and parallel connected capacitor means connected between said drive circuit and an appropriate side of the voltage input.

A stabilising winding (in series with a resistance if necessary) may be connected across the feed-back winding of the output transformer means in order to provide stabilised switching of the circuit when the output is not connected to a load.

BRIEF DESCRIPTION OF THE DRAWINGS

Several embodiments of the invention will now be described, by way of example, with reference to the accompanying drawings, in which.

DESCRIPTION OF THE PREFERRED EMBODIMENTS

Figure 1:
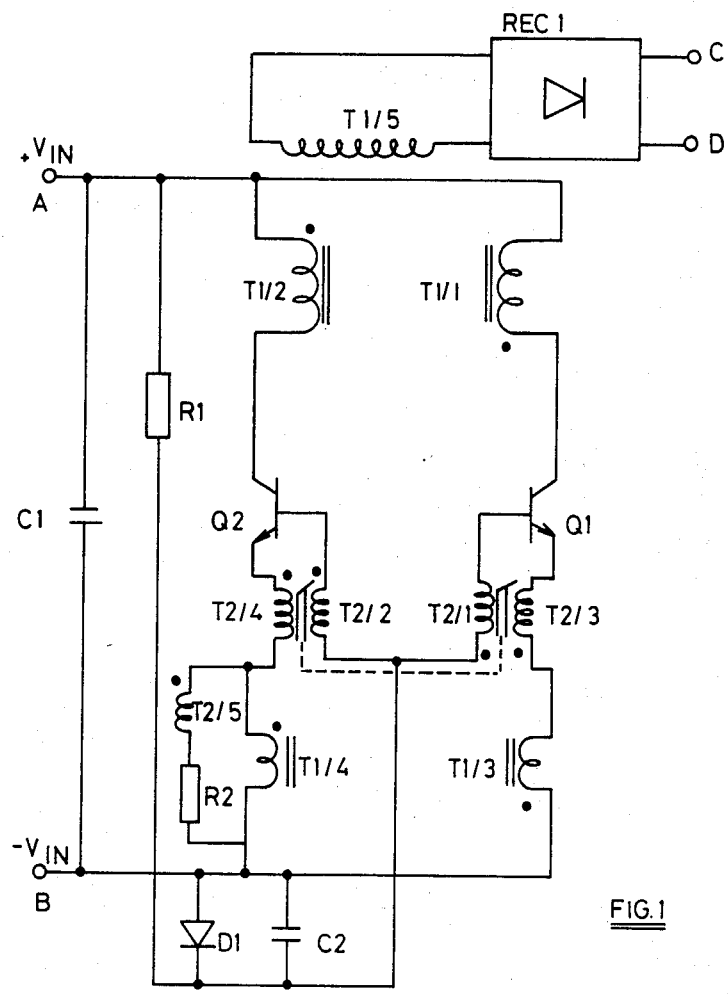
FIG. 1 shows an emitter drive switching converter circuit according to the invention.

Referring to FIG. 1 of the drawings, a converter according to the invention includes transformer means comprising a saturable drive transformer T2 and an output transformer T1.

The circuit is provided with input terminals A and B, across which a smoothing capacitor C1 is connected.

The circuit includes transistor means comprising two type npn bipolar transistors Q1 and Q2, whose bases constitute control electrodes and whose collector-emitter circuits each constitute main current circuits.

The collector-emitter circuits of these transistors are connected in series with primary windings T2/3, T2/4 of a saturating drive transformer T2, the secondary windings of which T2/1 and T2/2 provide current feed-back to the bases and maintain switching (oscillation) with the transformer running into saturation. The two sections T2/1, T2/3 and T2/2, T2/4 of the transformer share a common core. Output is delivered from the collector-emitter circuits through output transformer T1 having primary windings T1/1 to T1/4 and a secondary winding T1/5 feeding a rectifier circuit RECI having output terminals C and D.

It will be understood that the transformer T1 has a ratio selected to provide the required output voltage at terminals C and D. Typically the transformation of input voltage from the terminals A and B to the output voltage at C and D may be from 6 to 200 or 200 to 6 depending upon the requirements of the apparatus with which the converter is required to be used.

The bases of transistors Q1, Q2 are connected, through windings T2/1, T2/2 and resistor R1 to positive terminal A. Diode D1 acting as a zener and shunted by capacitor C2 provides positive bias for the bases of Q1 and Q2.

Current changes in winding T2/3 induce positive current feed-back in winding T2/1, said feed-back current in winding T2/1 being proportional to the rate of change of the current flowing in winding T2/3.

Likewise, current changes in winding T2/4 induce positive current feed-back in winding T2/2, said feed-back current in winding T2/2 being proportional to the rate of change of the current flowing in winding T2/4.

All of the primary windings T1/1, T1/2, T1/3 and T1/4, provide coupling to the output secondary winding T1/5, of the output transformer T1, but the windings T1/3 and T1/4 also ensure that the drive branches of the circuit containing windings T2/1 and T2/2 receive a feed-back voltage (i.e. that developed across T1/4 and T1/3 respectively to initiate switching under no load conditions.

A stabilising winding T2/5 of transformer T2 is connected in series with a resistance R2 and serves to stabilise switching of the circuit when the output is not connected to a load.

When a d.c. input is connected across terminals A and B, inevitable asymmetries in the drive circuit cause a first preferred transistor Q1 or Q2 to switch on. As current flowing through said first transistor increases, transformer T2 saturates and the base current, at least in part induced by (no longer present) changes of magnetic flux through the core of the base drive winding T2/1, T2/2 of that transistor, tends to zero, causing the circuit to favour conduction via the second transistor of the circuit, which second transistor now switches on while the first transistor simultaneously switches off. Similarly, as current through the second transistor rises, transformer T2 again saturates, causing the base current of the second transistor to decrease, thus causing the second transistor to switch off and the first transistor to switch on again.

The transistors continually switch alternately on and off as described above for as long as said d.c. input is connected across terminals A and B.

There is considerable flexibility in the choice of switching frequency. It may be above the audible range in suitable cases, typically 30K Hz. In this case, ferrite cored transformers would be used. Lower switching frequencies may also be used within the audible range where the particular application of the converter makes this appropriate.

As described above, the transistors are connected for mutually exclusive on and off conditions of conduction and alternately switch on and off at said frequency. The collector and emitter currents through each of the transistors have essentially square wave forms.

For a given application of the converter, it is arranged that the base current of each transistor is sufficient even under worst-case conditions, to give rise to a peak collector-emitter current in that transistor which can sustain that transistor into saturation at its lowest d.c. current gain.

In prior art electrical converters, unless high gain transistors were employed, then under worst-case conditions, their base currents were insufficient to cause them to saturate.

In the circuit of FIG. 1, however, the transistors employed may be of normal gain and have forced d.c. current gains approximately determined by the ratio number of turns of winding T2/1 to number of turns of winding T2/3 (for transistor Q1), and the turns ratio T2/2 to T2/4 (for transistor Q2). These forced gains are sufficient to ensure that a worst-case base current will be sufficient to cause a transistor to saturate.

Any undesirably large collector-emitter current through the transistors tends to be curtailed by means of said voltage feed-back in the drive circuits derived from the associated winding T1/3 and T1/4.

Thus heating losses which would otherwise arise from large collector-emitter currents are avoided or reduced.

Such large base currents could for example arise should the converter be subjected to an overload, e.g. should the output terminals of the converter be short-circuited.

It will be appreciated that said current feed-back an said voltage feed-back are not entirely independent of each other. For example, voltage feed-back provided affects current in the main current circuit through the transistor concerned and therefore affects any current feed-back due to changes in that current but not to such an extent as to seriously counteract the desired function of the positive current feed-back to the base of the transistor.

Figure 2:
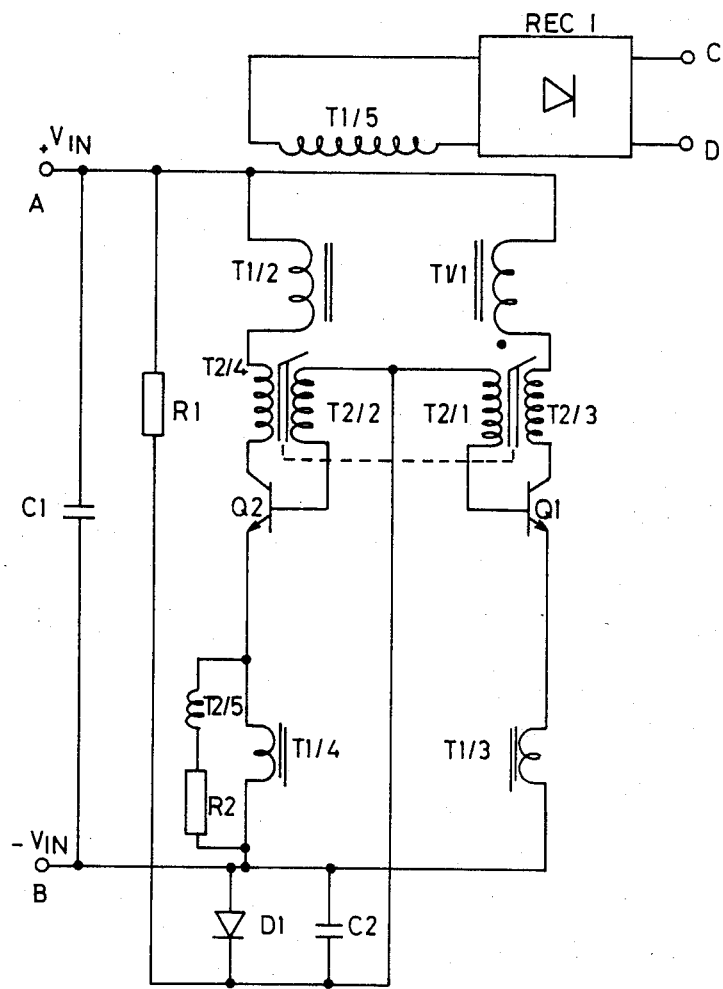
FIG. 2 shows a collector drive switching converter circuit according to the invention.

FIG. 2 illustrates a somewhat modified circuit, like references being applies to components having functions corresponding to those of FIG. 1. The difference between the circuits is that in FIG. 2, windings T2/3 and T2/4 of transformer T2 are connected in series between the positive rail from positive terminal A and the collectors of the transistors Q1, Q2 respectively so that changes in the collector currents of transistors Q1 and Q2 (as distinct from changes in their emitter currents) provide sources of current feed-back to windings T2/1 and T2/2 of drive transformer T2 during that phase of operation when transformer T2 is unsaturated.

Figure 3:
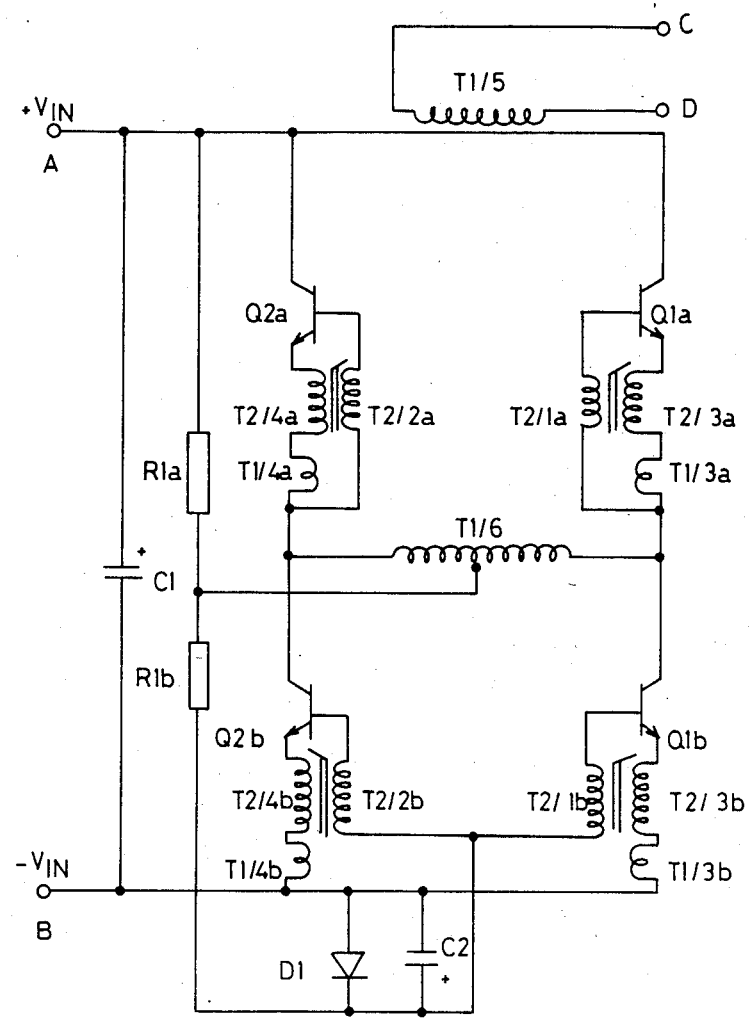
FIG. 3 shows a bridge emitter drive converter circuit according to the invention.
Figure 4:
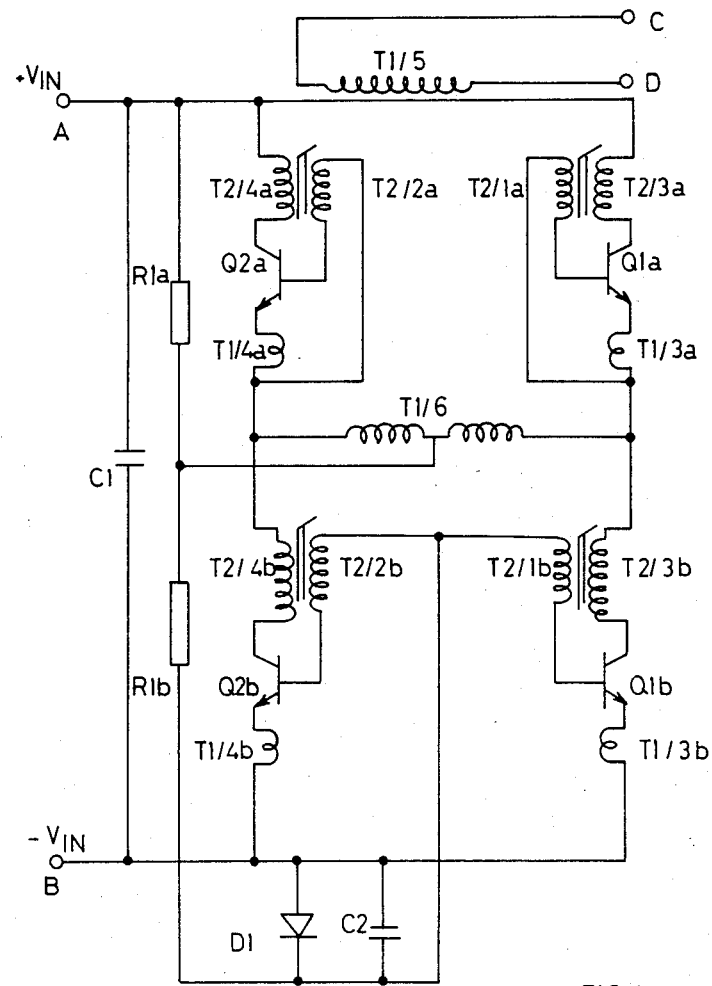
FIG. 4 shows a bridge collector drive converter circuit according to the invention.

FIGS. 3 and 4 shows bridge-type converter circuits intended mainly for providing an a.c. output from a d.c. input.

Components corresponding functionally to those already described with reference to FIGS. 1 and 2 are designated by like references with a suffix a or b for respective "halves" of the circuit and the preceding description is to be deemed to apply.

The transistors Q1a; Q2a; Q1b; Q2b; are provided with positive current feed-back to their bases respectively by windings T2/1a; T2/2a; T2/1b; T2/2b; and voltage feed-back to their emitters by windings T1/3a;

T1/4a; T1/3b; T1/4b respectively as in the circuits of FIGS. 1 and 2 and for the same purposes.

Transistors Q1a and Q2b conduct simultaneously while Q2a and Q1b are non-conducting and this status inverts providing for flow of current successively in opposite directions through T1/6. The winding T1/6 of transformer T1 induces a current/voltage in a winding T1/5 which supplies an unrectified a.c. output to output terminals C and D. If desired, a rectifier may be incorporated into either circuit between winding T1/5 and output terminals C and D. Switch means may be provided to permit a user selectively to connect said rectifier into the circuit to obtain a d.c. or an a.c. output as required.

These circuits have the same advantages over prior art circuits as the circuits of FIGS. 1 and 2.

Although the invention has been primarily described with reference to circuits incorporating npn transistors, the invention is equally applicable to circuits using pnp transistors or using a mixture of pnp and npn transistors (in which latter case appropriate phase differences of 180° must be introduced, or removed from, between appropriate transistors of different types).

Also, the circuits may be adapted so as to use Field Effect Transistors.

Typical applications to which one or more of the above converter circuits is or are suited are for example:

(i) The powering of lighting, or ancillary equipment requiring power from a lower voltage source, on an electrically driven vehicle such as a milk float or a fork-lift truck by connecting a suitable circuit in accordance with the invention across the entire battery of such a vehicle, which typically provides approximately 72 volts d.c., the parameters of said circuit being such that it provides an output of approximately 12 volts (say) for lighting purposes. Thus all of the cells of the battery are used for lighting. Prior to this invention, power for lighting on such vehicles has been obtained by connecting lighting circuits across less than the total number of cells e.g. the last two cells of such a battery. These last two cells have been found to fail much sooner than the remaining cells thereby necessitating replacement of the entire (relatively expensive) battery at a stage when most of its cells are still in good condition.

(ii) The powering of electrical tools (for example, hand tools) such as drills, sanders, circular saws and the like. A suitable converter circuit in accordance with the invention may be connected to (say) a 12 volt car battery, which is portable, and may provide a 240 volt output (a.c. or d.c. as appropriate) to the motor of the tool, thus permitting the tool to be used at virtually any location without any need for a nearby mains supply;

(iii) The powering of resistive loads used for heating purposes; and (iv) Powering of navigational equipment for seaways such as flashing lamps on buoys. Batteries used as the power sources in such cases have output voltages which are not compatible with direct energisation.

There are many further applications for example for unregulated d.c.-d.c. converters such as those provided by, or obtainable from, the circuits specifically hereinbefore describe.

To enable the converter to be turned off when required, the drive circuit may be modified to include means for biasing the bases of both transistors Q1 and Q2 to a value rendering these transistors non-conducting. Such means may be manually operable by suitable means in the converter circuit. Alternatively it may comprise a biasing circuit in the converter for receiving 'on' and 'off' signals from some remote point at which a controlling circuit generating these signals would be provided, operable manually or by programming means as appropriate to the particular application of the converter.

To protect the transistors Q1 and Q4 from damage during periods when they are non-conducting, and when they may otherwise be subjected to reversed voltages when there is a reactive load component, the transistors may be shunted by diodes connected in a sense to carry the reversed current. These diodes have been omitted from the current diagrams for simplicity.

I claim:

1. An electrical converter for supplying electrical power to a load from a d.c. source comprising:
semi-conductor switching means for converting a direct input current to an alternating current; and
an output transformer means fed with said alternating current for changing the magnitude of an output voltage with respect to an input voltage, wherein the semi-conductor means includes transistor means comprising a pair of transistors connected for mutually exclusive on and off conditions of conduction, each transistor of that pair being connected to a saturable drive transformer in a configuration which provides for switching in response to saturation of the drive transformer which includes at least a portion of primary windings connected respectively in series with the main current emitter collector circuits of the transistors of that pair, and having at least a portion of secondary windings connected to respective control electrodes of the transistors of that pair to provide current feed-back to a drive branch of the circuit connected to a control electrode of said transistor means said current feed-back comprising a means for increasing the response of the transistor means to drive signals derived from the input current and for providing a forced D.C. gain, thereby enabling a lower gain transistor means to be employed for a given minimum input voltage from the source, and wherein a voltage feed-back winding of the output transformer means is connected in the main current circuit of the transistor means in a configuration to provide voltage feed-back in the main current circuit in a sense to curtail the current in said main current circuit.

2. An electrical converter according to claim 1 wherein the drive transformer has a stabilising winding connected in parallel with said voltage feed-back winding of the output transformer means and comprises a means for stabilization of switching of the circuit when the circuit is not under load.

3. An electrical converter according to claim 1 wherein the main current circuits are connected in series with at least a portion of primary windings of said output transformer means, said output transformer means having a secondary winding which provides the output of the converter.

4. An electrical converter according to claim 3 wherein said converter includes two pairs of said transistors connected in a bridge configuration circuit, said input being applies across one diagonal of the bridge and said output transformer means being connected across the other diagonal of the bridge.

* * * * *